US008806636B2

(12) United States Patent
Okamura et al.

(10) Patent No.: US 8,806,636 B2
(45) Date of Patent: Aug. 12, 2014

(54) METHOD AND SYSTEM FOR PROVIDING TERMINAL SECURITY CHECKING SERVICE

(75) Inventors: Mine Okamura, Tokyo (JP); Masaya Norifusa, Tokyo (JP)

(73) Assignee: NEC Corporation, Tokyo (JP)

( * ) Notice: Subject to any disclaimer, the term of this patent is extended or adjusted under 35 U.S.C. 154(b) by 1307 days.

(21) Appl. No.: 11/484,649

(22) Filed: Jul. 12, 2006

(65) Prior Publication Data
US 2007/0016950 A1 Jan. 18, 2007

(30) Foreign Application Priority Data

Jul. 12, 2005 (JP) ................................. 2005-203562

(51) Int. Cl.
*G06F 21/00* (2013.01)
(52) U.S. Cl.
USPC ............................................. 726/24; 726/22
(58) Field of Classification Search
USPC ..................................................... 726/22, 24
See application file for complete search history.

(56) References Cited

U.S. PATENT DOCUMENTS

| 6,170,055 | B1 * | 1/2001 | Meyer et al. | 713/2 |
|---|---|---|---|---|
| 6,813,725 | B1 * | 11/2004 | Hanes et al. | 714/2 |
| 6,990,660 | B2 * | 1/2006 | Moshir et al. | 717/171 |
| 7,020,895 | B2 * | 3/2006 | Albrecht | 726/22 |
| 7,058,807 | B2 * | 6/2006 | Grawrock et al. | 713/172 |
| 7,310,817 | B2 * | 12/2007 | Hinchliffe et al. | 726/24 |
| 7,424,706 | B2 * | 9/2008 | Ivanov et al. | 717/169 |
| 7,424,745 | B2 * | 9/2008 | Cheston et al. | 726/24 |
| 7,533,415 | B2 * | 5/2009 | Chen et al. | 726/24 |
| 7,574,743 | B2 * | 8/2009 | Masuzawa et al. | 726/24 |
| 7,591,018 | B1 * | 9/2009 | Lee | 726/24 |
| 7,827,263 | B1 * | 11/2010 | Howarth et al. | 709/223 |
| 2005/0015606 | A1 * | 1/2005 | Blamires et al. | 713/188 |
| 2005/0283640 | A1 * | 12/2005 | Cheston et al. | 714/4 |
| 2006/0075486 | A1 * | 4/2006 | Lin et al. | 726/20 |
| 2008/0282351 | A1 * | 11/2008 | Khilnani et al. | 726/24 |

FOREIGN PATENT DOCUMENTS

| JP | 2002-196942 A | 7/2002 |
|---|---|---|
| JP | 2003-303114 A | 10/2003 |
| JP | 2004-289723 A | 10/2004 |
| JP | 2005-72636 A | 3/2005 |
| JP | 2005-157421 A | 6/2005 |

OTHER PUBLICATIONS

An Effective Modified Security Auditing Tool (SAT); A. Baith Mohamed M.; 23rd Int. Conf. Information Technology Interfaces ITI 2001; Jun. 19-22, 2001.*
Methods for the Prevention, Detection and Removal of Software Security Vulnerabilities; Jay-Evan J. Tevis, John A. Hamilton, Jr.; ACM Southeast Conference'04, Apr. 2-3, 2004, Huntsville, AL, USA. Copyright 2004.*

* cited by examiner

*Primary Examiner* — Luu Pham
*Assistant Examiner* — James Turchen
(74) *Attorney, Agent, or Firm* — Sughrue Mion, PLLC

(57) ABSTRACT

A terminal security checking service providing method and a system for the same are provided which are capable of updating information to be used as security measures even while the system is being shared among users. When one or more external media are connected to one or more terminals, information for security check is transferred to a security checking server. Security check results are transmitted through the one or more terminals, one or more external media, and an external medium initializing unit to the security checking server. Information to be used as security measure corresponding to the security check results is sent back from the security checking server through the external medium initializing unit to the one or more external media to initialize the one or more external media.

27 Claims, 10 Drawing Sheets

METHOD AND SYSTEM FOR PROVIDING TERMINAL SECURITY CHECKING SERVICE

BACKGROUND OF THE INVENTION

1. Field of the Invention

The present invention relates to a method and a system for providing a terminal security checking service, and more particularly to the method and the system for providing the terminal security checking service, which are capable of achieving higher-level security and flexibility even while the system is shared among users and of increasing flexibility of the system.

The present application claims priority of Japanese Patent Application No. 2005-203562 filed on Jul. 12, 2005, which is hereby incorporated by reference.

2. Description of the Related Art

In recent years, the Internet has come into widespread use and enterprise networks are being constructed on the Internet, while Internet viruses make entries into terminal devices (hereinafter simply a "terminal") for the enterprise networks and worm viruses cause a shutdown of such the enterprise networks, which has a significant effect on enterprise activities. To avoid such events, software that can make a check of entries of worm viruses or a security patch to be applied for a fix to security holes in an OS (Operating System) of a terminal and in application software, or a like are widely installed, however, daily thorough checking by using such security described above is becoming more difficult.

As a conventional security measure, a PC (Personal Computer) quarantine system is used which makes a security check when a terminal is connected to an enterprise network and provides, after completion of the security check of the terminal, information to be used as security measures (information about security protection) that can cover a weakness/a unreliability of a security measure already taken for the terminal, for example, a security patch. The conventional PC quarantine system is roughly classified under two types, one being a first-type system configured to have a server to provide terminal security checking service and a client software and the other being a second-type system configured to have a server to provide terminal security checking service and a clientless module. In the above first-type system, dedicated client software is installed on a terminal. In the above second-type system, no dedicated client software is installed on a terminal.

FIG. 10 is a diagram showing configurations of an example of the above conventional first-type PC quarantine system. The first-type PC quarantine system chiefly includes a terminal 100 installing security checking client software 111, a security checking server 200, and a network connection managing system 300. These components are connected to a network 400 constructed within a same corporate organization.

In the first-type PC quarantine system, when the terminal 100 is connected to the network 400, the security checking client software 111 collects information about an OS of the terminal 100, information about a version of virus checking software, or a like and transmits the information to the security checking server 200. The security checking server 200 checks, according to preset contents to be used for checking, whether or not a specified security patch is applied. Then, results from the security checking are transferred from the security checking server 200 to the network connection managing system 300. If the result from the security checking is OK, the terminal 100 is connected to the network 400 in an enterprise to perform ordinary processing tasks. However, if the result from the security checking is NG (not good), or shows an error, the terminal 100 is guided so as to be connected to a network in which only a security measure such as application of a security patch corresponding to the NG/error result from the security checking can be taken.

Moreover, one example of the second-type PC quarantine system is disclosed in Patent Reference 1 (Japanese Patent Application Laid-open No. 2003-303114). The security protecting system disclosed as the second-type PC quarantine system chiefly includes a USB (Universal Serial Bus) key, a PC, and a Web server. To receive security checking service by using the disclosed security protecting system, a user inserts the USB key into a USB port of a PC. States of an OS installed in the PC are checked by a program to receive security checking service stored in the USB key. Then, the PC accesses a Web server to which information about the states of the installed OS is transferred as results from the security checking.

The Web server stores, in advance, information to be used as a security measure, for example, a security patch. The Web server, when receiving the information about states of the OS from the PC, judges whether or not the OS installed in the PC is in the newest security state. If the information to be used as the security measure against the states of the OS installed in the PC, for example, the security patch stored in the Web server is not yet applied to the OS installed in the PC (that is, the OS is not yet in the newest security state), a guidance for application of the security patch is displayed on the Web. The user applies the security patch according to the guidance displayed on the Web.

In addition, the Patent Reference 1 also describes that the Web server judges whether the information about the OS to be received by the Web server coincides (or does not coincide) with information about the OS installed on a user's PC being managed by the Web server and, if no coincidence occurs between the information, the information about the OS installed on the user's PC being managed by the Web server is replaced with new information about the OS received by the Web server. Then, a safe set file corresponding to the updated information about the OS for which security measures have been taken is downloaded into the user's PC which ensures the security of the PC.

In the conventional first-type terminal security checking service providing system described above, installation of the dedicated client software is a technological requirement. As a result, in a situation where an access point of the Internet provided by various providers outside a specified organization, for example, in public places is to be used, to provide the security checking service causes a hitch easily. For example, in the case where a system to be used varies from one organization or one provider to another, if tasks that extend over more than one organization are to be performed or a plurality of providers is to be accessed, it is made necessary to install dedicated client software that can correspond to each system.

Moreover, in the case when operations are performed at a cooperative partner, installation of licensed client software must be performed after acquiring a license for a dedicated client software of a system introduced by the cooperative partner and, therefore, a difficult problem of who bears the license fee arises. Another problem is that, since the installation of dedicated client software takes much time and efforts and thorough uninstalling of the dedicated client software after the termination of the cooperative tasks is difficult, it is necessary that a new terminal for cooperative tasks is additionally prepared, which is costly.

In the conventional second-type terminal security checking providing system described above, there arises no technological problem caused by the installation of dedicated client software on a terminal. However, there is a limit to what can be checked by the security checking providing system, that is, the second-type terminal security checking providing system is not yet in a stage where service of providing a security patch or a like is made to be concrete and, therefore, a technological problem of insufficient provision of security measures needed by a terminal remains unsolved.

These technological problems can be solved to some extent by the security protecting system disclosed in the Patent Reference 1 in which the technology provided by the security protecting system is effective as the security measure, however, the security protecting system is lacking in the means that can update information to be used as security measures and in the technology that can make the security measure means shareable among users.

In addition to the above, in the security protecting system disclosed in the Patent Reference 1, both its security checking service providing section and its network connection processing section to be driven according to security check results operate in a direct ganged manner, that is, there is a strong dependent relationship in the connection between the security checking service providing section and network connection processing section and, therefore, the security protecting system is lacking in the technological unit to achieve the system operation in close liaison with the security checking service providing section and with other network managing sections and maintenance of such the network connection managing section is a burden to users.

SUMMARY OF THE INVENTION

In view of the above, it is an object of the present invention to provide a method and a system for providing a terminal security checking service, which are capable of providing information to be used as a security measure for a user on an individual basis and of constructing a system of a soft connected structure.

According to a first aspect of the present invention, there is provided a terminal security checking service providing method including:

connecting at least one external medium having a storing unit to store security check client software and a security measure information storing unit to at least one terminal of which a security check is to be made;

collecting information held in the terminal by the security check client software;

transmitting the collected information to a security checking server;

making a security check of the information received by the security checking server to produce information to be used as the security measures;

sending back the produced information to be used as the security measures to the security measure information storing unit of the external medium; and initializing the security measure information storing unit by using the sent-back information to be used as the security measures.

In the foregoing, a preferable mode is one wherein the external medium has a security check result storing unit which receives results from the security checking from the security checking server, wherein the results from the security checking received by the security check result storing unit are transmitted to the security checking server.

Also, a preferable mode is one wherein the information to be used as the security measures is fed from the security measure information storing unit to the terminal when the external medium is connected to the terminal.

According to a second aspect of the present invention, there is provided a terminal security checking service providing method including:

connecting at least one external medium having a storing unit to store security check client software and a security measure information storing unit to at least one terminal of which a security check is to be made;

collecting information held in the terminal by the security check client software;

transmitting the collected information to a security checking server;

making a security check of the information received by the security check server to produce information to be used as the security measures; and feeding results from the security checking from the security checking server to a network connectability judging unit of a network connection managing system;

wherein the feeding of the results from the security checking from the security checking server to the network connectability judging unit is achieved by software processing between the security checking server and the network connectability judging unit.

In the foregoing, a preferable mode is one wherein the software processing is performed by an application programming interface (API).

Also, a preferable mode is one wherein the network connectability judging unit switches connection between networks to which the terminal is to be connected.

According to a third aspect of the present invention, there is provided a terminal security checking service providing method including:

connecting at least one external medium having a storing unit to store security check client software and a security measure information storing unit to at least one terminal of which a security check is to be made;

collecting information held in the terminal by the security check client software;

transmitting the collected information to a security checking server;

making a security check of the information received by the security checking server according to a security check policy;

judging whether the terminal is to be or not to be connected to networks according to results from the security checking and to connectability policy in the network connection managing system; and wherein a policy distributing server is connected to the security checking server and the network connection managing system and wherein the security policy and the connectability policy are distributed from the policy distributing server individually to each of the security checking server and the network connection managing system.

According to a fourth aspect of the present invention, there is provided a terminal security checking service providing method including:

connecting at least one external medium having a storing unit to store security check client software and a security measure information storing unit to at least one terminal of which a security check is to be made;

collecting information held in the terminal by the security check client software;

transmitting the collected information to a security checking server; and making a security check of the information received by the security check server;

wherein, during a time period from start to end of the security checking, information is distributed by connecting an information distributing server to the terminal.

In the foregoing, a preferable mode is one wherein the security checking is started when the information collected by the security check client software to be run by connecting the external medium to the terminal has been transmitted to the security checking server.

According to a fifth aspect of the present invention, there is provided a terminal security checking service providing system including:

at least one terminal of which a security check is to be made;

at least one external medium having a storing unit to store security check client software and a security measure information storing unit, which is to be connected to the terminal;

a security checking server being connected to the terminal to make a security check of information, which is held in the terminal, to be collected by the security check client software to be run when the external medium is connected to the terminal and to produce information to be used as the security measures; and a sending-back unit to send back the information to be used as the security measures produced by the security checking server to a security measure information storing unit in the external medium;

wherein the security measure information storing unit is initialized by the information to be used as the security measures to be sent back by the sending-back unit.

In the foregoing, a preferable mode is one wherein the sending-back unit is so configured that a feeding unit to feed the information to be used as the security measures from the security checking server to the security measure information storing unit is interposed between the security measure information storing unit and the security checking server.

Also, a preferable mode is one wherein the external medium has a security check result storing unit to receive results from the security checking from the security checking server and wherein the security check result storing unit is connected to the security checking server.

Also, a preferable mode is one wherein the information to be used as the security measures is fed from the security measure information storing unit to the terminal by connecting the external medium to the terminal.

According to a sixth aspect of the present invention, there is provided a terminal security checking service providing system including:

at least one terminal of which a security check is to be made;

at least one external medium having a storing unit to store security client check client software and a security measure information storing unit, which is to be connected to the terminal;

a security checking server, which is to connected to the terminal, to make a security check of information, which is held in the terminal, to be collected by the security check client software to be run when the external medium is connected to the terminal;

a network connection managing system having a network connectability judging unit for judging whether or not a permission of connection to a network is to be given to the terminal; and a feeding unit to feed results from the security checking from the security checking server to the network connectability judging unit;

wherein the feeding unit is so configured that a software processing unit is installed between an output of the security checking server and an input of the network connectability judging unit.

In the foregoing, a preferable mode is one wherein the software processing is performed by an application programming interface (API).

Also, a preferable mode is one wherein the network connectability judging unit switches connection between networks to which the terminal is to be connected.

According to a seventh aspect of the present invention, there is provided a terminal security checking service providing system including:

at least one terminal of which a security check is to be made;

at least one external medium having a storing unit to store security client check client software and a security measure information storing unit, which is to be connected to the terminal;

a security checking server, which is to be connected to the terminal, to make a security check of information, which is held in the terminal, to be collected by the security check client software to be run when the external medium is connected to the terminal according to a security policy;

a network connection managing system having a storing unit to store a connectability policy and to judges whether the terminal is to be or not to be connected to networks according to results from the security checking and to the connectability policy;

wherein a policy distributing server to be connected to the security checking server and to the network connection managing system is installed and wherein the security policy and the connectability policy are distributed from the policy distributing server individually to each of the security checking server and the network connection managing system.

According to an eighth aspect of the present invention, there is provide a terminal security checking service providing system including:

at least one terminal of which a security check is to be made;

at least one external medium having a storing unit to store security client check client software and a security measure information storing unit, which is to be connected to the terminal;

a security checking server, which is to be connected to the terminal, to make a security check of information, which is being held in the terminal, to be collected by the security check client software to be run when the external medium is connected to the terminal and wherein, during a time period from start to end of the security checking, information is distributed by connecting an information distributing server to the terminal.

In the foregoing, a preferable mode is one wherein the security checking is started when the information collected by the security check client software to be run by connecting the external medium to the terminal has been transmitted to the security checking server.

With the above configuration, information held in a terminal is collected by security checking client software installed on an external medium to be run by connection to the terminal and a security check is made of the collected information by using a security checking server to produce information to be used as the security measures and the produced information to be used as security measures is sent back to a security measure information storing unit and the security measure information storing unit is initialized by using the sent-back information to be used as security measures and, therefore, the improved security of the terminal can be ensured even while use of the external medium is shared by other user.

With another configuration as above, even after construction of the terminal security checking service providing system made up of the system to ensure the security of the terminal and the network connection managing system, connection relation between the above two systems that allows easy selection of the network connection management system is established and, therefore, the security system can be configured with flexibility.

With still another configuration as above, the security policy to be used by the security checking server and network connection managing system can be initialized in a timely manner and, therefore, high-level security can be ensured.

With still another configuration as above, the information distributing server is connected to the terminal during a time period from start to end of the security checking, the use of latency time can be made effectively.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings. According to the embodiments, a system for providing a terminal security checking service of the present invention is so configured that information about a terminal or terminals of which a security check is/are to be made is/are collected by security checking client software and the collected information is transmitted to a security checking server and information to be used as a security measure corresponding to the information about the terminals of which the security check is to be made is sent back from the security checking server to a security measure information storing unit associated with the security checking client software to initialize the security measure information storing unit. In addition, the terminal security checking service providing system is so configured that a network connection managing system is connected to the system in a manner to establish a flexibly connected relationship.

First Embodiment

Figure 1:
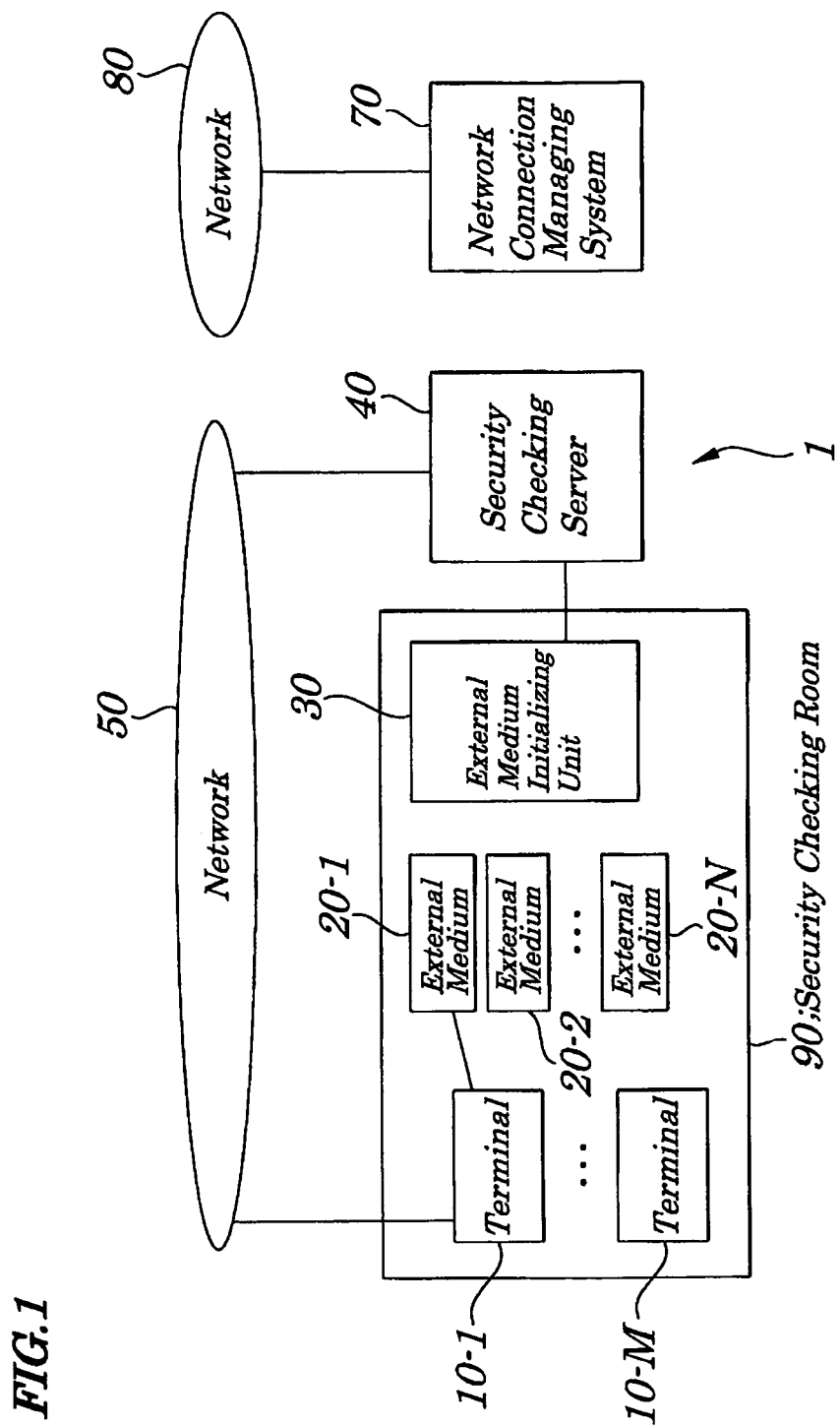
FIG. 1 is a block diagram showing configurations of a terminal security checking service providing system according to a first embodiment of the present invention.
Figure 2:
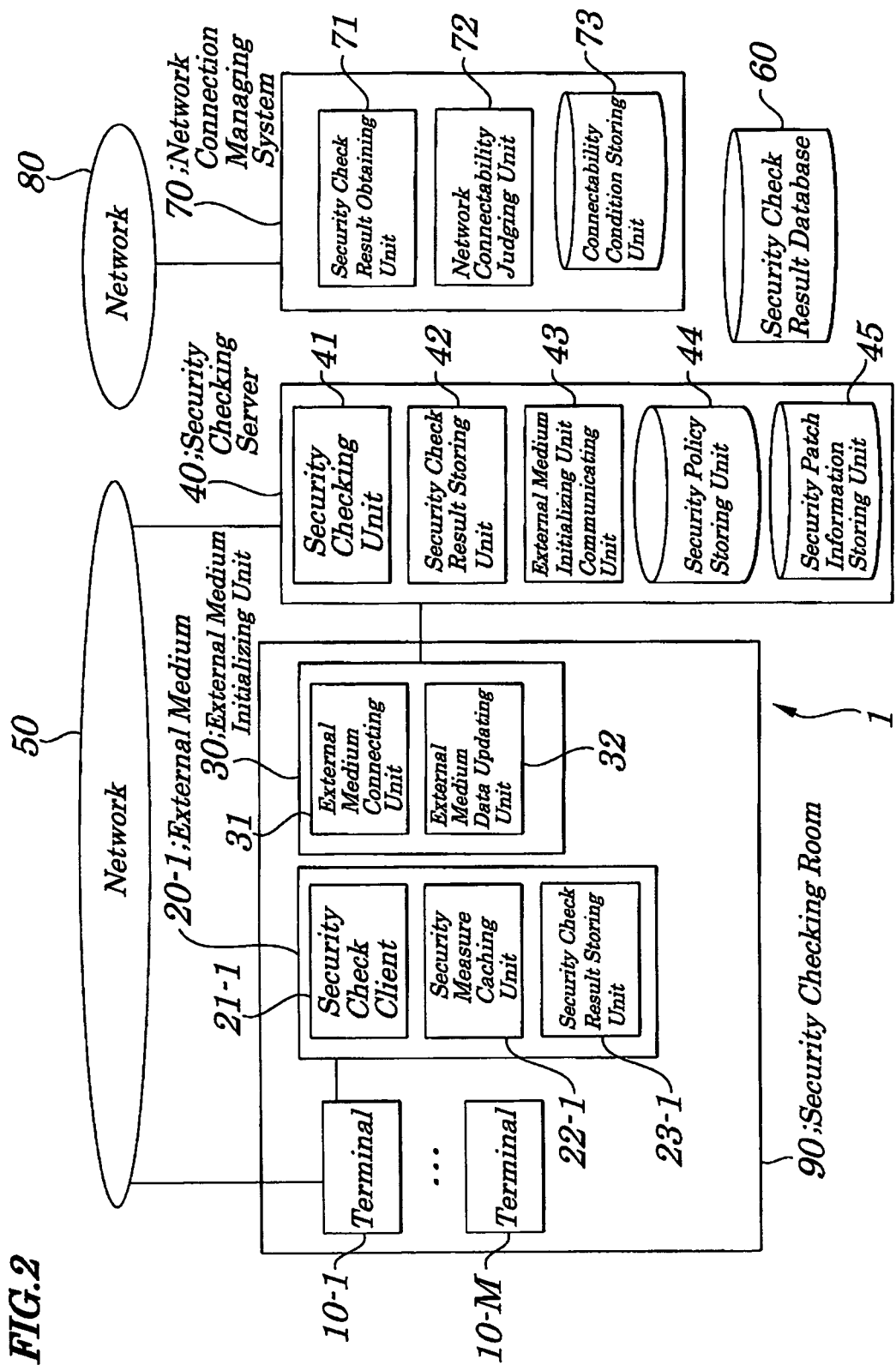
FIG. 2 is a block diagram showing, in detail, configurations of the terminal security checking service providing system according to the first embodiment of the present invention.
Figure 3:
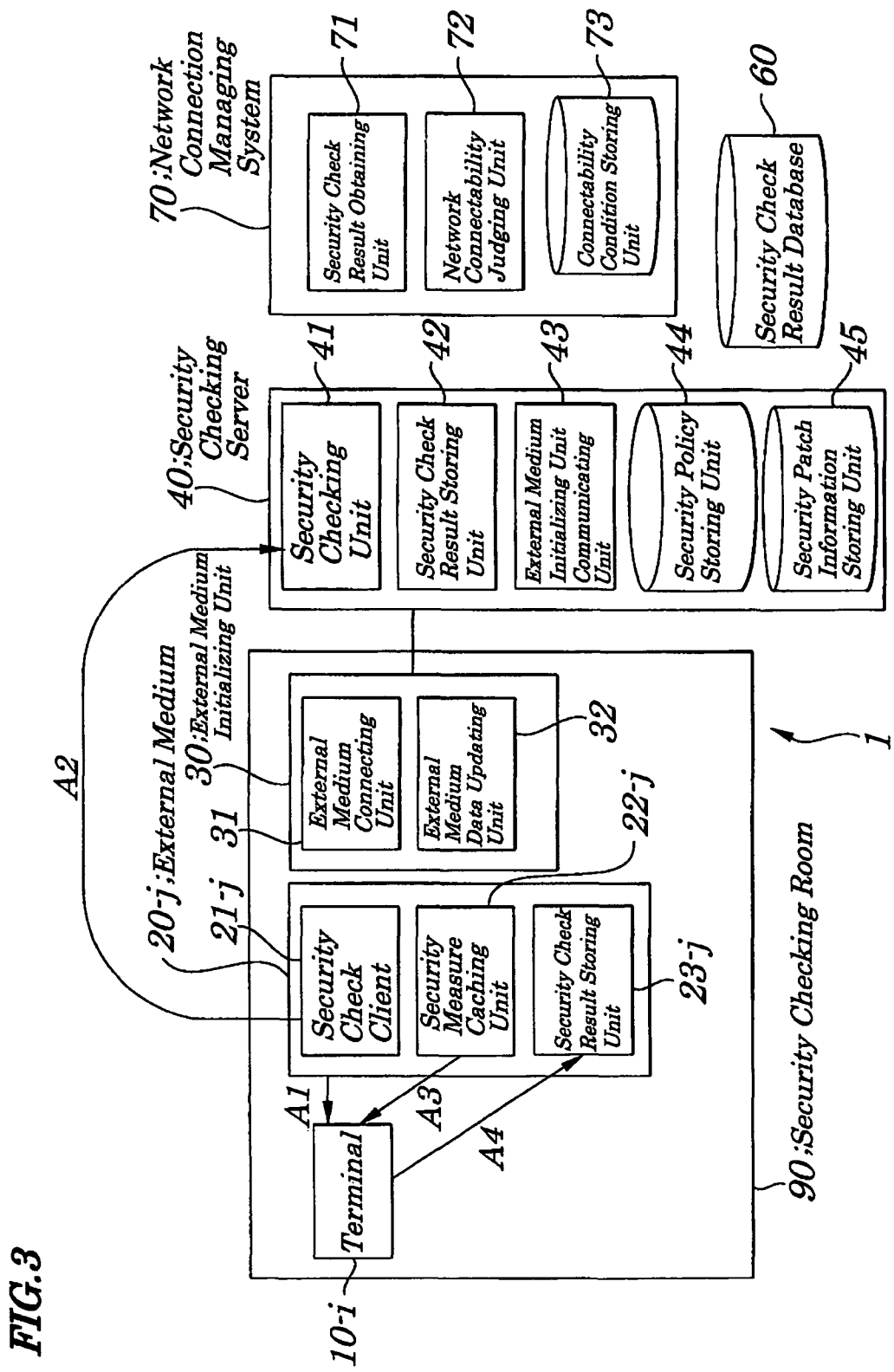
FIG. 3 is a block diagram explaining processes of security checking by the terminal security checking service providing system according to the first embodiment of the present invention.
Figure 4:
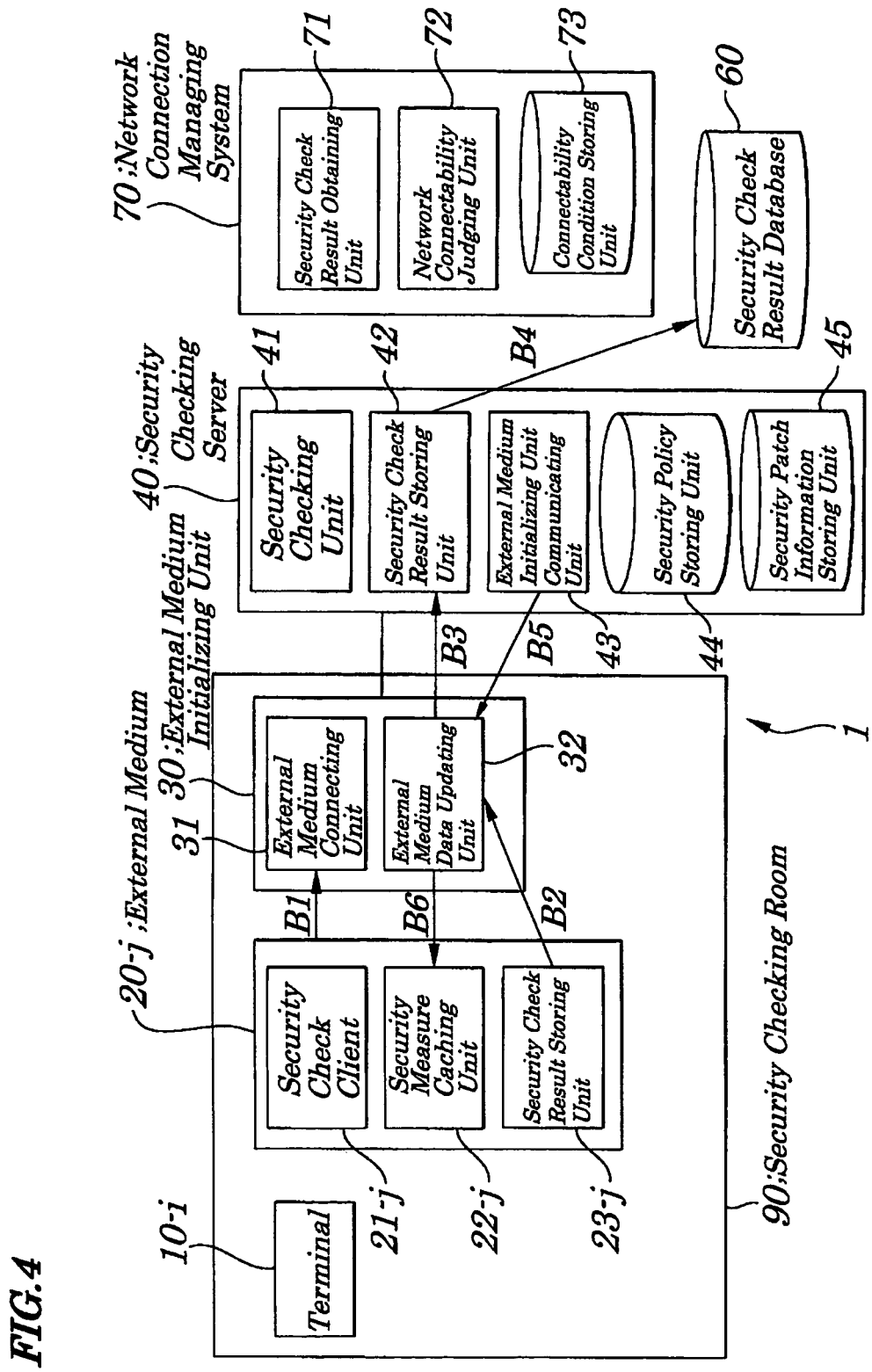
FIG. 4 is a block diagram explaining processes of initialization of the terminal security checking service providing system according to the first embodiment of the present invention.
Figure 5:
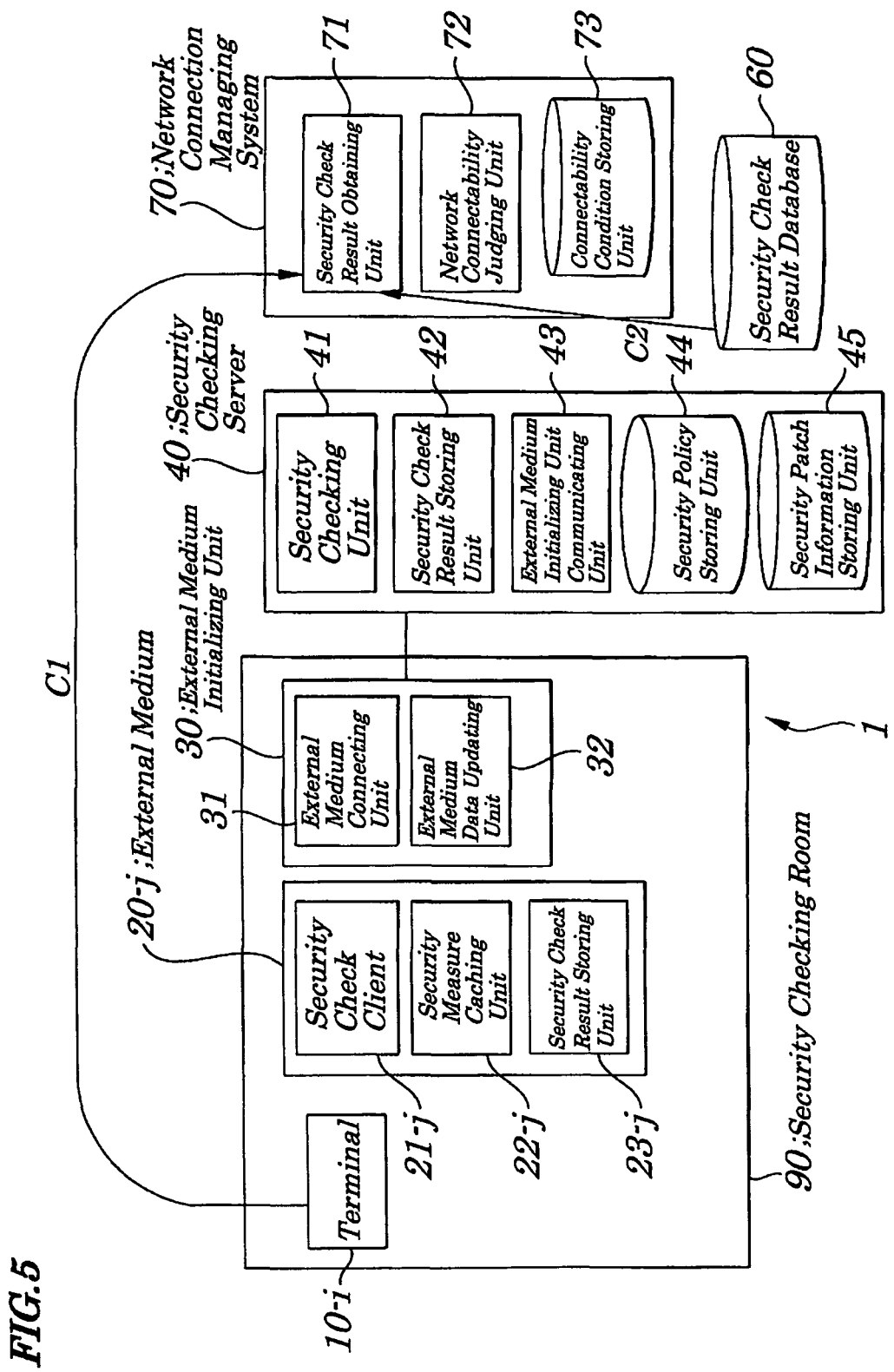
FIG. 5 is a block diagram explaining judging processes of connectability of the terminal security checking service providing system according to the first embodiment of the present invention.

FIG. 1 is a block diagram showing configurations of a terminal security checking service providing system according to a first embodiment of the present invention. FIG. 2 is a block diagram showing, in detail, configurations of the terminal security checking service providing system according to the first embodiment. FIG. 3 is a block diagram explaining processes of security checking by the terminal security checking service providing system of the first embodiment. FIG. 4 is a diagram explaining processes of initialization of the terminal security checking service providing system of the first embodiment. FIG. 5 is a block diagram explaining judging processes of connectability of the terminal security checking service providing system according to the first embodiment.

In the terminal security checking service providing system 1, information about objects on which a security check is to be made in a terminal is collected by inserting an external medium that stores security checking client (program) into the terminal and information to be used as security measures stored in the external medium is updated, when necessary, according to results from security checking of the information of the terminal to ensure security of the terminal by using the information to be used as security measures and results from the security checking are input to a network connection managing system by flexibly connected inputting unit. The terminal security checking service providing system 1, as shown in FIGS. 1 to 5, includes terminal 10-i (i=1, 2, ..., M), external medium 20-j (i=1, 2, ..., N), an external medium initializing unit 30, a security checking server 40, a network 50, a network connection managing system 70, and a network 80.

The terminal 10-i and the security checking server 40 can communicate with one another over the network 50. The external medium initializing unit 30 is connected to the security checking server 40 over the network 50 or directly by a cable. The network connection managing system 70 is connected to the network 80 to which a user of the terminal 10-i belongs as a subscriber. The network 50 may or may not be connected to the network 80.

The terminal 10-i, external medium 20-j, and external medium initializing unit 30 are placed in a security checking room 90 set up in a corner of a building, lounge at an airport, or public place such as an Internet coffee shop. The external medium 20-j is a processing unit having a connecting terminal, which includes a storing device to store security checking client software (hereinafter simply "security check client"), information to be used as security measures (for example, a security patch), or a like.

The external medium 20-j, as shown in FIGS. 1 to 5, includes a security check client 21-j, a security measure caching unit 22-j, a security check result storing unit 23-j. The external medium 20-j has the same configurations and, therefore, a detailed configuration of the external medium 20-1 is described by referring to FIG. 2. The security check client 21-1, as shown in FIG. 2, is automatically run when the external medium 20-1 is inserted into (connected to) the terminal 10-1 and a connecting terminal of the external medium 20-1 is connected to a connecting terminal of the terminal 10-1 and collects information of the terminal 10-1 of which a security check is to be made and transmits the collected information to the security checking server 40.

The security measure caching unit 22-1 is a unit to receive data (information to be used as security measures) such as a security patch required for taking the security measure with timing when connection is established between a connecting terminal of the external medium 20-1 and that of the external medium initializing unit 30 by inserting the external medium 20-1 into the external medium initializing unit 30.

The security check result storing unit 23-1 is a unit to receive and store security check results received from the security checking server 40 after the security check of the terminal 10-1 to be made by the security checking server 40 is completed.

The external medium initializing unit 30 has a connecting terminal to be connected to the connecting terminal of the external medium 20-1 which is used to connect the external medium initializing unit 30 to the external medium 20-1 and initializes the external medium 20-1 by using the information to be used as security measures fed from the security checking server 40. The external medium initializing unit 30 includes an external medium connecting unit 31 and an external medium data updating unit 32.

The external medium connecting unit 31 is a unit to connect the external medium 20-1 to the external medium initializing unit 30 and to check whether or not the external medium 20-1 is connected exactly. The external medium data updating unit 32 is a unit to write data (information to be used as security measures) such as a security patch required to take security measures or a like to the external medium 20-1 with the external medium 20-1 being connected to the external medium initializing unit 30.

The security checking server 40 includes a security checking unit 41, a security check result storing unit 42, an external medium initializing unit communicating unit 43, a security policy storing unit 44, and a security patch information storing unit 45.

The security checking unit 41 is a unit to make a security check of the terminal 10-i according to information collected by the terminal 10-i and transmitted to the security checking server 40 and to a security checking policy stored in the security policy storing unit 44.

The security check result storing unit 42 is a unit to store security check results, after completion of the security checking by the security checking unit 41, into the security check result storing unit 42 itself or into a security check result database 60 which operates in liaison with the security checking server 40.

The external medium initializing unit communicating unit 43 is a unit to communicate with the external medium initializing unit 30 and to transfer updated information through the external medium data updating unit 32 to the external medium 20-1 to initialize the external medium 20-1, with the external medium 20-1 being connected to the external medium initializing unit 30 and with timing when security checking is made by the security checking unit 41 and, as a result, the security patch information storing unit 45 is initialized.

The network connection managing system 70 includes a security check result obtaining unit 71, a network connectability judging unit 72, and a connectability condition storing unit 73. The security check result obtaining unit 71 is a unit to obtain security check results of the terminal 10-i directly from the terminal 10-i or from the security check result database 60 when the terminal 10-i is to be connected to the network 50. The network connectability judging unit 72 judges whether or not a permission of connection to a network is to be given to the terminal 10-i by checking the security check results against connectability conditions stored in the connectability condition storing unit 73 after obtaining security check results of the terminal 10-i via the security check result obtaining unit 71, that is, an API (Application Programming Interface) and to do switching between the networks 50 and 80.

Next, operations of the terminal security checking service providing system 1 of the first embodiment are described by referring to FIGS. 1 to 5. To receive service of the terminal security checking service providing system 1 of the first embodiment, the terminal 10-i is brought into the security checking room 90 and the prepared external medium 20-j is connected to the terminal 10-i (see A1 in FIG. 3) By this connection, the security check client 21-j (security checking software) stored in the external medium 20-j are automatically run and the information about the terminal 10-i of which a security check is to be made is collected and the collected information is transmitted through the network 50 to the security checking server 40 and a security check of the collected information is made by the security checking unit 41 in the security checking server 40 according to a security policy.

If the security patch to be applied to a security hole found through the security checking proves to be insufficient as a result of the security checking, necessary security measures are provided from the external medium 20-j to the terminal 10-i (see A3 in FIG. 3). Then, the security check results are written from the security checking server 40 through the network 50 into the terminal 10-i and the external medium 20-j (see A4 in FIG. 3).

Next, when the external medium 20-j is inserted into (connected to) the external medium initializing unit 30 (see B1 in FIG. 4), the security check results are transmitted from the external medium 20-j to the security checking server 40 (B2 and B3 in FIG. 4) and are stored in the security check result storing unit 42 and then in the security check result database 60 (see B4 in FIG. 4). As a result, the security checking unit 41 in the security checking server 40 initializes the security patch information storing unit 45 in response to the security check results stored in the security check result storing unit 42 and, with timing of the initialization, contents registered on the security measure caching unit 22 are initialized (written) by using the updated information to be used as security measures (for example, security patch information) via the external medium initializing unit communicating unit 43 and the external medium data updating unit 32 and the security check results stored in the security check result storing unit 23-j in the external medium 20-j are erased and the security check result storing unit 23-j is initialized (B5 and B6 in FIG. 4). The updated contents registered on the security measure caching unit 22 are used as the security measure for the terminal 10-i when the external medium 20-j is again connected to the terminal 10-i.

As described above, when the terminal 10-i provided with security check results is to be connected, when necessary, to the network 80 to which a user's PC is linked, the security check results of the terminal 10-i are fed to the network connection managing system 70 via the security check result obtaining unit 71 of the network connection managing system 70 (see C1 in FIG. 5) or when the terminal 10-i is to be connected to the network 80, the security check results of the terminal 10-i are fed from the security check result database 60 via the security check result obtaining unit 71 to the network connection managing system 70 (see C2 in FIG. 5).

The network connectability judging unit 72, after having obtained the security check results via the security check result obtaining unit 71 (API to interpret the security check results), checks the obtained security results against connectability conditions stored in the connectability condition storing unit 73 to judge whether or not a permission of connection is to be given to the terminal 10-i. If the connection is permitted, switching between the networks 50 and 80 is done.

Moreover, after such the security check as described above, if a security check of the terminal 10-i is again to be made in the security checking room 90, the security checking server 40 checks present states of the terminal 10-i against the previous security check results to judge whether or not another security check is to be made. When the security check is again made and the security patch information storing unit 45 in the security checking server 40 is initialized, contents stored in the security measure caching unit 22-j in the external medium 20-j are updated, through the external medium data updating unit 32, so as to correspond to the initialization of the security patch information storing unit 45.

Thus, according to the configurations employed in the first embodiment, information to be used as security measures stored in the external medium to be applied to a given terminal out of a plurality of terminals is updated according to security check results of the given terminal and, therefore, even if the external medium is being used by other users in a state where the external medium is shared among users, irrespective of the shared use of the external medium, highly improved security of the given terminal can be ensured. Furthermore, the first system in which a security check of a terminal is made is separated from the second system in which a network connection management is performed so that security check results of the terminals can be referred to by using the API and, therefore, the second system corresponding to the reference results by the API can be easily selected even after construction of the entire terminal security checking service providing system, which provides flexibility to the system configurations and, as a result, the terminal security checking service providing system is excellent in expandability.

Second Embodiment

Figure 6:
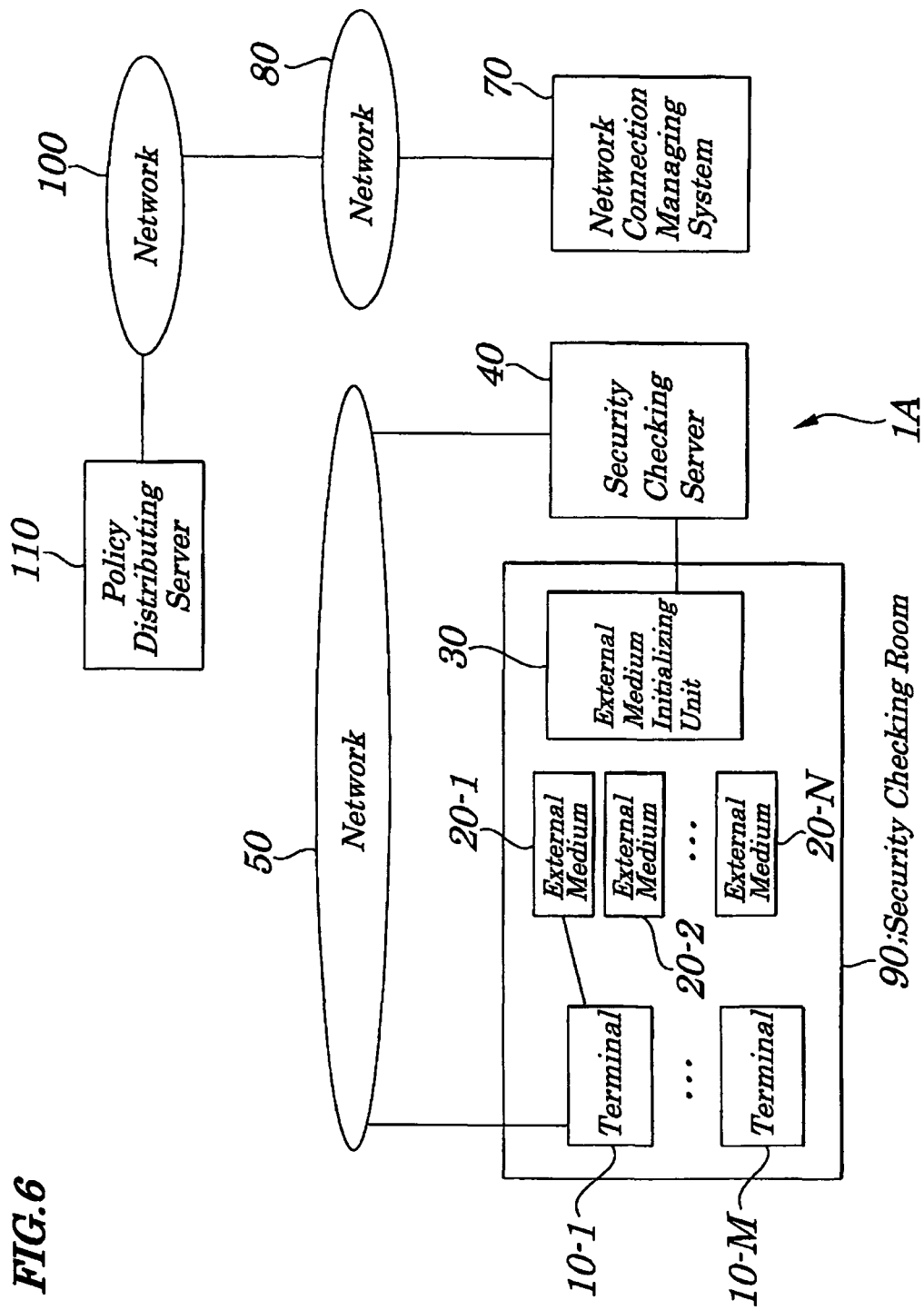
FIG. 6 is a block diagram showing configurations of a terminal security checking service providing system according to a second embodiment of the present invention.
Figure 7:
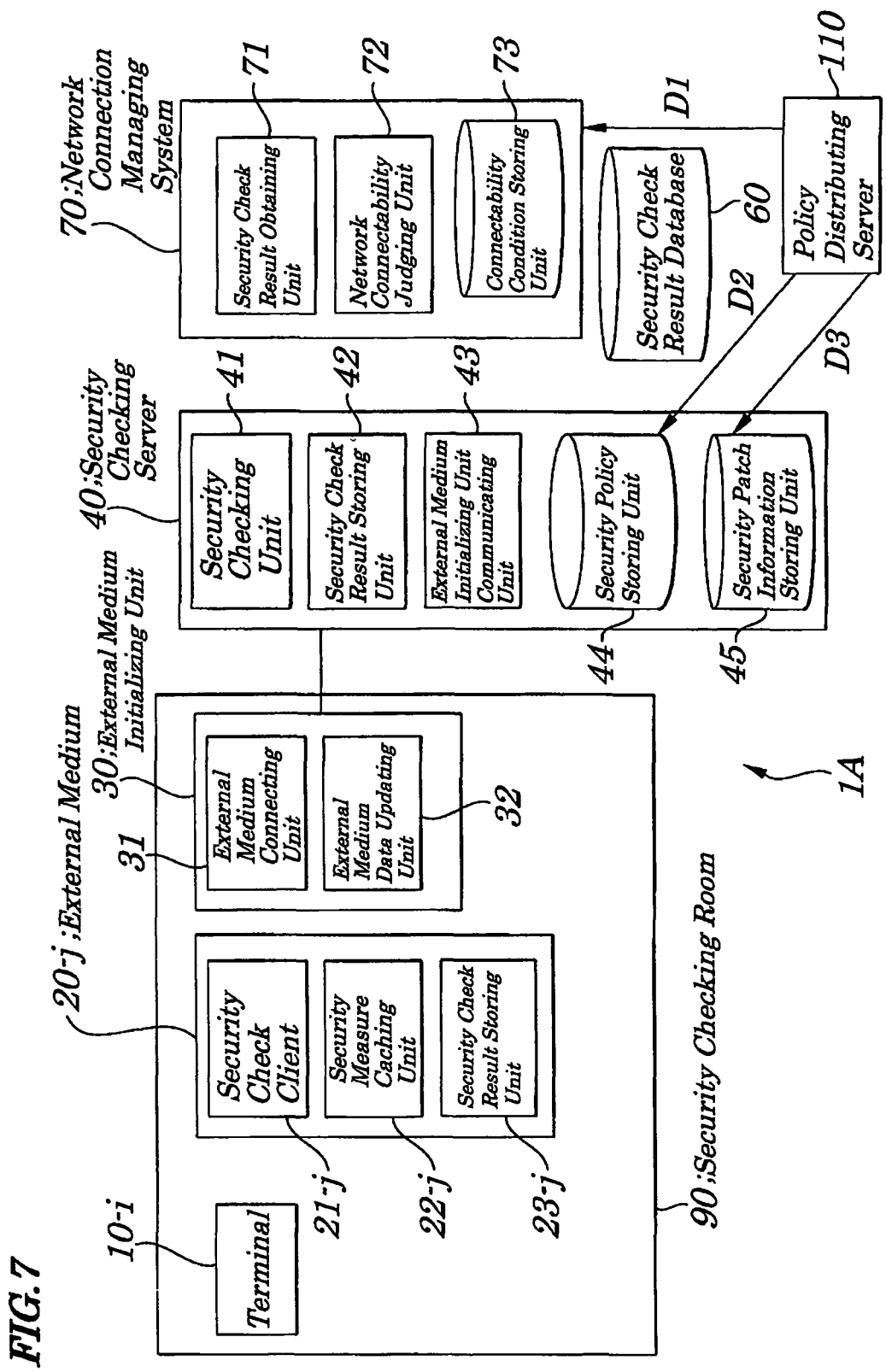
FIG. 7 is a block diagram explaining operations of the terminal security checking service providing system according to the second embodiment of the present invention.

FIG. 6 is a block diagram showing configurations of a terminal security checking service providing system according to the second embodiment of the present invention. FIG. 7 is a block diagram explaining operations of the terminal security checking service providing system according to the second embodiment. Configurations of the second embodiment differ greatly from those of the first embodiment in that a connectability condition, security patch, and security check policy are provided as operating service to achieve up-to-date security measures.

That is, in the terminal security checking service providing system 1A of the second embodiment, a security condition distributing server (hereinafter simply a "policy distributing server") 110 through a network (Internet) 100 to the network 80. The policy distributing server 110 produces a security policy such as security patch information, connectability condition data, security check policy, or a like to store the produced security policy on the policy distributing server 110, with timing when security conditions have been changed, for example, with timing when a security patch or virus check software has been updated. Moreover, a network connection managing system 70 is so configured as to be communicable through the networks 80 and 100 to the policy distributing server 110 periodically or nonperiodically in case of emergency and as to be able to distribute the information obtained by the communication to a security policy storing unit 44, security patch information storing unit 45, and connectability condition storing unit 73. Configurations other than above in the second embodiment are the same as those in the first embodiment and same reference numbers are assigned to parts having the same functions as in the first embodiment and their descriptions are omitted accordingly.

Next, operations of the terminal security checking service providing system 1A of the second embodiment are described by referring to FIGS. 6 and 7. Operations other than those of the policy distributing server 110 to be described below are the same as those in the first embodiment and their descriptions are omitted accordingly. The policy distributing server 110 produces security patch information, connectability condition data, and security check policy, with timing when security conditions have been changed in the same manner as in the case of the first embodiment, for example, with timing when the security patch has been updated and stores the produced security policy on the policy distributing server 110.

On the other hand, the network connection managing system 70 communicates with the policy distributing server 110 through the networks 80 and 100 periodically, or unperiodically in case of emergency and initializes the security policy storing unit 44, security patch information storing unit 45, and connectability condition storing unit 73 (D1, D2, and D3 in FIG. 7) and updating of the information to be used as security measures is made to reflect the information about the updating of security measures of each of the security policy storing unit 44, security patch information storing unit 45, and connectability condition storing unit 73.

Thus, according to configurations of the terminal security checking service providing system of the second embodiment, information stored in the security policy storing unit, security patch information storing unit, and connectability condition storing unit is updated in a timely manner by using the policy distributing server and, therefore, the information to be updated is effective in ensuring high-level security.

Third Embodiment

Figure 8:
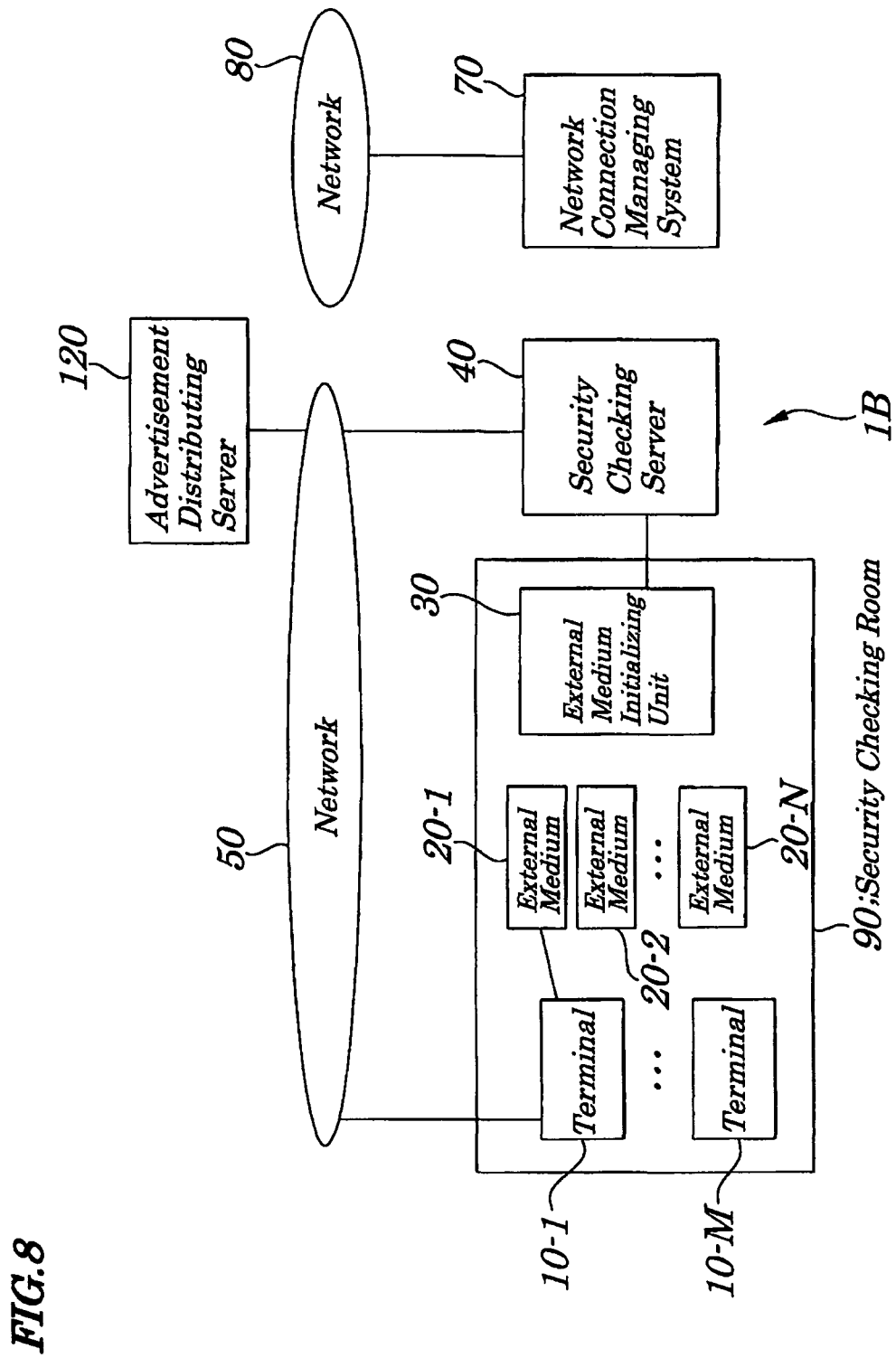
FIG. 8 is a block diagram showing configurations of a terminal security checking service providing system according to a third embodiment of the present invention.
Figure 9:
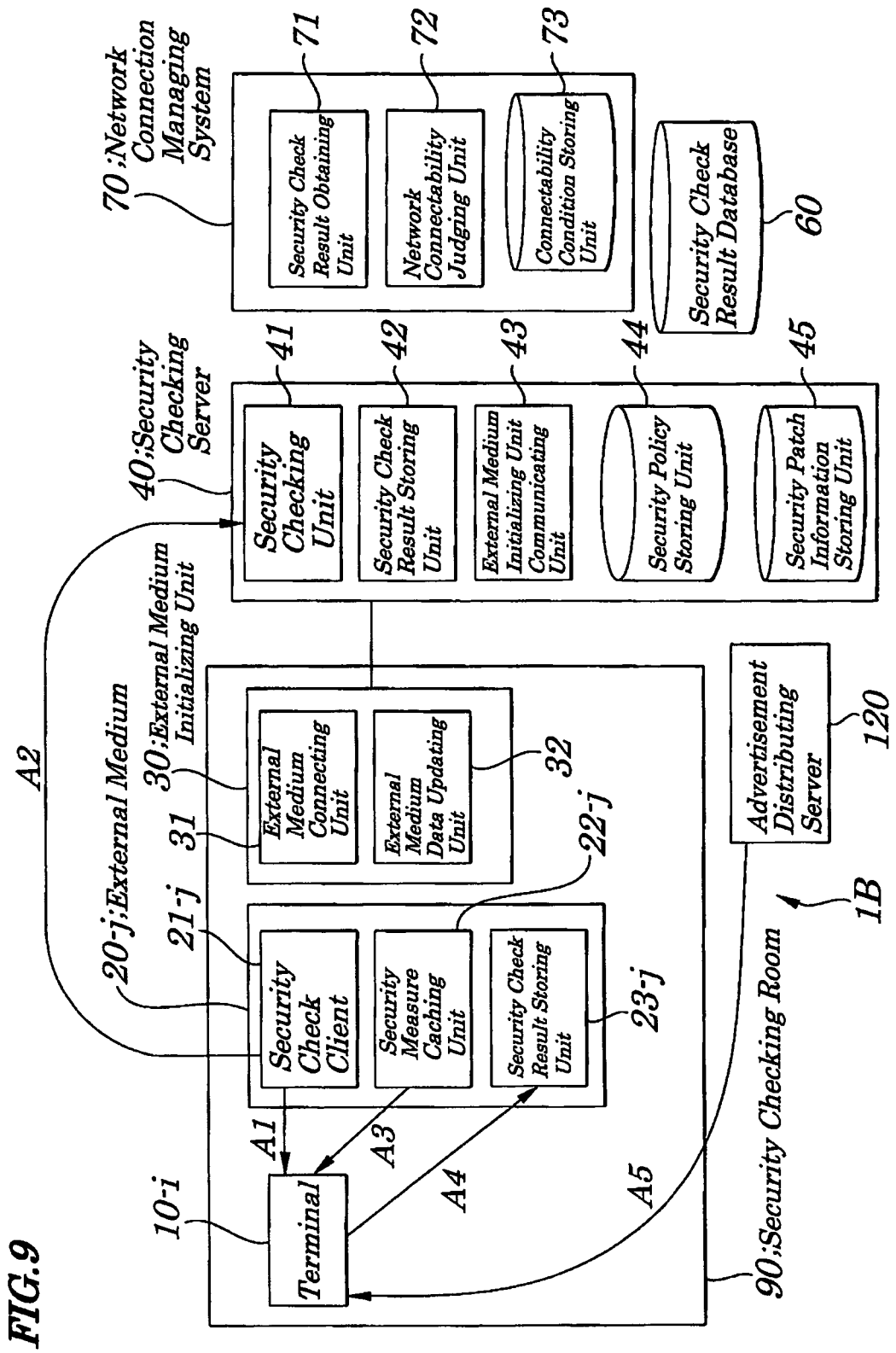
FIG. 9 is a block diagram explaining operations of the terminal security checking service providing system according to the third embodiment of the present invention.
Figure 10:
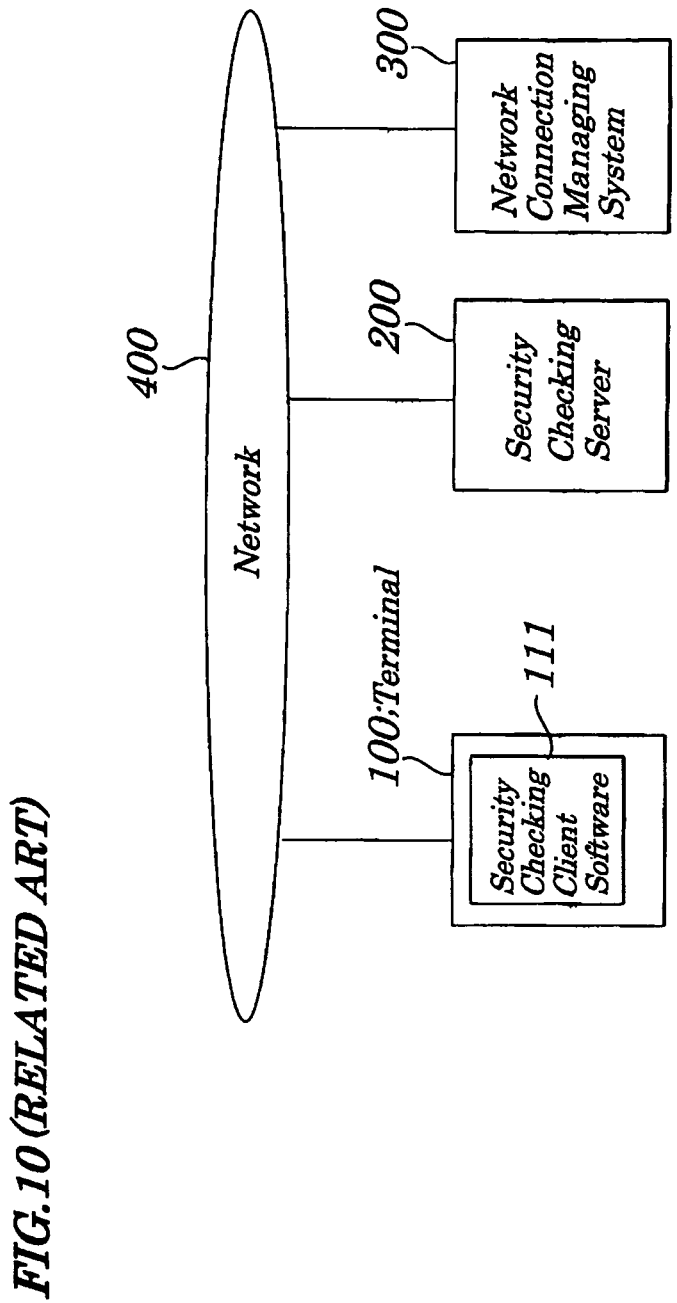
FIG. 10 is a diagram showing configurations of a conventional PC quarantine system.

FIG. 8 is a diagram schematically showing configurations of a terminal security checking service providing system 1B of the third embodiment of the present invention. FIG. 9 is a diagram explaining operations of the terminal security checking service providing system according to the third embodiment. Configurations of the third embodiment differ greatly from those of the first embodiment in that advertisements can be distributed for latency time during which security checking service is being provided.

That is, in the terminal security checking service providing system 1B of the third embodiment, as shown in FIG. 8, a characterizing portion of the third embodiment is that an advertisement distributing server 120 is connected to the network linked to the terminal security checking service providing system 1 shown in FIG. 1. The advertisement distributing server 120 distributes advertisements to the terminal 10-i while a security check of the terminal 10-i is being made by the security check server 40 on the Internet 50. Configurations other than described above are the same as those in the first embodiment and same reference numbers are assigned to parts having the same functions as in the first embodiment and their descriptions are omitted accordingly.

Next, operations of the terminal security checking service providing system 1B are described by referring to FIGS. 8 and 7. Operations other than those of the advertisement distributing server 120 to be described below are the same as those in the first embodiment and their descriptions are omitted accordingly. In the terminal security checking service providing system 1B, a security check of the terminal 10-i is started by the security check server 40. The security check processing to be performed among the external medium 20-j, terminal 10-i, and security checking server 40 is the same as those in the first embodiment (the processing A1, A2, and A3 in FIG. 9 are the same as A1, A2 and A3 in FIG. 3).

For latency time during which the security check is being made, the advertisement distributing server 120 being connected through the network 50 to the terminals 10-i distributes advertisements to the terminal 10-i (A5 in FIG. 9). When the above security check is completed, security check results are written into the terminal 10-i and external medium 20-j (see A4 in FIG. 9).

Thus, according to configurations of the terminal security checking service providing system of the third embodiment, for latency time during which the security check of the terminal is being made, advertisements can be distributed from the advertisement distributing server, over the network, to the terminal and, therefore, a provider of security checking service, by operating the system in liaison with a sponsor of the advertisement, can provide more cost-effective service.

It is apparent that the present invention is not limited to the above embodiments but may be changed and modified without departing from the scope and spirit of the invention. For example, the terminal security checking service providing system of the present invention may be so configured that the advertisement distributing server employed in the third embodiment is embedded in the system of the second embodiment.

In the above embodiments, when one or more external media are employed for security checking of one or more terminals, security check results used for identification and authentication of each terminal are transferred from the one or more terminals to one or more external media and security measure information corresponding to the security check results are sent back to the security checking server, one or more external media, and one or more terminals. However, when the information about a terminal of which a security check is to be made is transferred from the terminal to the security check server, the information used for identification and authentication of the terminal may be transferred to the security check server and, after completion of the security checking by the security check server, security measures corresponding to security check results held by the security check server may be sent back to the terminal corresponding to the information about the identification and authentication to be used for ensuring security of the terminal. In addition, the advertisement distributing server described in the third embodiment may be embedded in the above modified configurations of the terminal security checking service providing system of the present invention.

Moreover, in the above configurations, the security condition (policy condition) described in the second embodiment may be distributed from the policy distributing server to the security checking server and the network connection managing system. Furthermore, the advertisement distributing server described in the third embodiment may be also embedded in this modified configurations of the terminal security checking service providing system of the present invention.

What is claimed is:

1. A method for providing a terminal security checking service, the method comprising:

inserting an external medium into a terminal, wherein the external medium contains a storing unit to store a security check client software, a security check result storing unit to store results of security checking, and a security measure information storing unit to store a security patch for fixing a vulnerability in information held in at least one terminal;

establishing, by the terminal, a terminal connection between said external medium and said terminal of which a security check is performed;

automatically running said security check client software in said external medium in response to the terminal connection being established between said external medium and said terminal, including collecting information of said terminal, and transmitting the collected information to a security checking server using said terminal as an intermediary;

performing the security check at said security checking server of the collected information, producing the results of security checking, and transmitting the results to said external medium via network using said terminal as an intermediary;

storing the results received from said security checking server in said security check result storing unit of the external medium;

transmitting the results to said security checking server through an external initializing unit when said external medium is connected to said external initializing unit by inserting said external medium into the external initializing unit;

sending back from said security checking server a newest security patch as information for security measures to the external medium through said external initializing unit in response to the results received from said external medium; and initializing said security measure information storing unit by using the sent-back newest security patch.

2. The method according to claim 1, wherein said newest security patch is fed from said security measure information storing unit to said terminal when said external medium is connected to said terminal.

3. A method for providing a terminal security checking service, the method comprising:

inserting an external medium into a terminal, wherein the external medium contains a storing unit to store security check client software, a security check result storing unit to store results of security checking, and a security measure information storing unit to store a security patch for fixing a vulnerability in information held in at least one terminal;

establishing, by the terminal, a terminal connection between said external medium and said terminal of which a security check is performed;

automatically running said security check client software in said external medium in response to the terminal connection being established between said external medium and said terminal, including collecting information of said terminal, and transmitting the collected information to a security checking server using said terminal as an intermediary;

performing the security check at said security checking server of the collected information, producing the results of security checking, and transmitting the results to said external medium via network using said terminal as an intermediary;

storing the results received from said security checking server in said security check result storing unit of the external medium stores the results received from said security checking server;

transmitting the results to said security checking server through an external initializing unit when said external medium is connected to said external initializing unit by inserting said external medium into the external initializing unit;

sending back from said security checking server a newest security patch as information for security measures to the external medium through said external initializing unit in response to the results received from said external medium;

initializing said security measure information storing unit by using the sent-back newest security patch; and transmitting the results from said security checking server to a network connectability judging unit of a network connection managing system, wherein the transmitting of the results from said security checking server to said network connectability judging unit is achieved by software processing between said security checking server and said network connectability judging unit.

4. The method according to claim 3, wherein said software processing is performed by an application programming interface (API).

5. The method according to claim 3, wherein said network connectability judging unit switches connection between networks to which said terminal is to be connected.

6. A method for providing a terminal security checking service, the method comprising:

inserting an external medium into a terminal, wherein the external medium contains a storing unit to store security check client software, a security check result storing unit to store results of security checking, and a security measure information storing unit to store a security patch for fixing a vulnerability in information held in at least one terminal;

establishing, by the terminal, a terminal connection between said external medium and said terminal of which a security check is performed;

automatically running said security check client software in said external medium in response to the terminal connection being established between said external medium and said terminal, including collecting information of said terminal, and transmitting the collected information to a security checking server using said terminal as an intermediary;

performing the security check at said security checking server of the collected information according to a security check policy, producing the results of security checking, and transmitting the results to said external medium via network using said terminal as an intermediary;

storing the results received from said security checking server in said security check result storing unit of the external medium;

transmitting the results to said security checking server through an external initializing unit when said external medium is connected to said external initializing unit by inserting said external medium into the external initializing unit;

sending back from said security checking server a newest security patch as information for security measures to the external medium through said external initializing unit in response to the results received from said external medium;

initializing said security measure information storing unit by using the sent-back newest security patch; and judging whether said terminal is to be or not to be connected to networks according to the results and according to connectability policy in a network connection managing system, wherein a policy distributing server is connected to said security checking server and said network connection managing system and wherein said security policy and said connectability policy are distributed from said policy distributing server individually to each of said security checking server and said network connection managing system.

7. A method for providing a terminal security checking service, the method comprising:

inserting an external medium into a terminal, wherein the external medium contains a storing unit to store security check client software, a security check result storing unit to store results of security checking, and a security measure information storing unit to store a security patch for fixing a vulnerability in information held in at least one terminal;

establishing, by the terminal, a terminal connection between said external medium and said terminal of which a security check is performed;

automatically running said security check client software in said external medium in response to the terminal connection being established between said external medium and said terminal, including collecting information of said terminal, and transmitting the collected information to a security checking server using said terminal as an intermediary; and performing the security check at said security checking server of the collected information, producing the results of security checking, and transmitting the results to said external medium via network using said terminal as an intermediary; storing the results received from said security checking server in said security check result storing unit of the external medium;

transmitting the results to said security checking server through an external initializing unit when said external medium is connected to said external initializing unit by inserting said external medium into the external initializing unit;

sending back from said security checking server a newest security patch as information for security measures to the external medium through said external initializing unit in response to the results received from said external medium; and initializing said security measure information storing unit by using the sent-back newest security patch;

wherein, during a time period from start to end of the security check, information is distributed by connecting an information distributing server to the terminal.

8. The method according to claim 7, wherein said security checking is started when the collected information by the security check client software has been transmitted to said security checking server.

9. A system for providing a terminal security checking service, the system comprising:

at least one terminal of which a security check is performed;

at least one external medium including a storing unit to store security check client software, a security check result storing unit to store results of security checking, and a security measure information storing unit to store a security patch for fixing a vulnerability in information held in said at least one terminal, said at least one terminal capable of establishing a terminal connection with said external medium, the terminal connection is established in response to inserting said external medium into said at least one terminal; and a security checking server to make a security check of information held in said at least one terminal, produce the results of security checking, and transmit the results to said external medium via network using said at least one terminal as an intermediary, wherein said security check client software in said external medium is automatically run in response to the terminal connection being established between said external medium and said at least one terminal, and the security check client software collects the information of said at least one terminal, and transmits the collected information to said security checking server using said at least one terminal as an intermediary, wherein said security check result storing unit of the external medium stores the results received from said security checking server, wherein said security checking server is configured to receive the results from the external medium through an external initializing unit when said external medium is connected to said external initializing unit by inserting said external medium into the external initializing unit, wherein said security checking server is configured to send back a newest security patch as information for security measures to the external medium through said external initializing unit in response to the results received from said external medium, and wherein said security measure information storing unit is initialized by using the sent-back newest security patch.

10. The system according to claim 9, wherein said external medium initializing unit is so configured that a feeding interface to feed said newest security patch from said security checking server to said security measure information storing unit is interposed between said security measure information storing unit and said security checking server.

11. The system according to claim 9, wherein said newest security patch is fed from said security measure information storing unit to said at least one terminal by connecting said external medium to said at least one terminal.

12. A system for providing a terminal security checking service, the system comprising:

at least one terminal of which a security check is performed;

at least one external medium including a storing unit to store security check client software, a security check result storing unit to store results of security checking, and a security measure information storing unit to store a security patch for fixing a vulnerability in information held in said at least one terminal, said at least one terminal capable of establishing a terminal connection with said external medium, the terminal connection is established in response to inserting said external medium into said at least one terminal;

a security checking server to make a security check of information held in said at least one terminal, produce the results of security checking, and transmit the results to said external medium via network using said at least one terminal as an intermediary;

a network connection managing system having a network connectability judging interface for judging whether or not a permission of connection to a network is to be given to the at least one terminal; and a feeding interface to feed the results of the security checking from said security checking server to said network connectability judging interface;

wherein said security check client software in said external medium is automatically run in response to the terminal connection being established between said external medium and said at least one terminal, and the security check client software collects information of said at least one terminal, and transmits the collected information to said security checking server using said at least one terminal as an intermediary, wherein said security check result storing unit of the external medium stores the results received from said security checking server, wherein said security checking server is configured to receive the results from the external medium through an external initializing unit when said external medium is connected to said external initializing unit by inserting said external medium into the external initializing unit, wherein said security checking server is configured to send back a newest security patch as information for security measures to the external medium through said external initializing unit in response to the results received from said external medium, wherein said security measure information storing unit is initialized by using the sent-back newest security patch, and wherein said feeding interface is so configured that a software processing unit is installed between an output of said security checking server and an input of said network connectability judging interface.

13. The system according to claim 12, wherein said software processing is performed by an application programming interface (API).

14. The system according to claim 12, wherein said network connectability judging interface switches connection between networks to which said at least one terminal is to be connected.

15. A system for providing a terminal security checking service, the system comprising:

at least one terminal of which a security check is performed;

at least one external medium including a storing unit to store security check client software, a security check result storing unit to store results of security checking, and a security measure information storing unit to store a security patch for fixing a vulnerability in information held in said at least one terminal, said at least one terminal capable of establishing a terminal connection with said external medium, the terminal connection is established in response to inserting said external medium into said at least one terminal;

a security checking server to make a security check of information held in said at least one terminal, according to a security policy, produce the results of security checking, and transmit the results to said external medium via network using said at least one terminal as an intermediary; and a network connection managing system, having a storing unit to store a connectability policy, which judges whether said at least one terminal is to be or not to be connected to networks according to the results and according to said connectability policy, wherein said security check client software in said external medium is automatically run in response to the terminal connection being established between said external medium and said at least one terminal, and the security check client software collects information of said at least one terminal, and transmits the collected information to said security checking server using said at least one terminal as an intermediary;

wherein said security check result storing unit of the external medium stores the results received from said security checking server, wherein said security checking server is configured to receive the results from the external medium through an external initializing unit when said external medium is connected to said external initializing unit by inserting said external medium into the external initializing unit, wherein said security checking server is configured to send back a newest security patch as information for security measures to the external medium through said external initializing unit in response to the results received from said external medium, wherein said security measure information storing unit is initialized by using the sent-back newest security patch, and wherein a policy distributing server to be connected to said security checking server and to said network connection managing system is installed and wherein said security policy and said connectability policy are distributed from said policy distributing server individually to each of said security checking server and said network connection managing system.

16. A system for providing a terminal security checking service, the system comprising:

at least one terminal of which a security check is performed;

at least one external medium including a storing unit to store security check client software, a security check result storing unit to store results of security checking, and a security measure information storing unit to store a security patch for fixing a vulnerability in information held in said at least one terminal, said at least one terminal capable of establishing a terminal connection with said external medium, the terminal connection is established in response to inserting said external medium into said at least one terminal; and a security checking server to make a security check of information held in said at least one terminal, produce the results of security checking, and transmit the results to said external medium via network and using said at least one terminal as an intermediary, wherein said security check client software in said external medium is automatically run in response to the terminal connection being established between said external medium and said at least one terminal, and the security check client software collects information of said at least one terminal, and transmits the collected information to said security checking server using said at least one terminal as an intermediary, wherein said security check result storing unit of the external medium stores the results received from said security checking server, wherein said security checking server is configured to receive the results from the external medium through an external initializing unit when said external medium is connected to said external initializing unit by inserting said external medium into the external initializing unit, wherein said security checking server is configured to send back a newest security patch as information for security measures to the external medium through said external initializing unit in response to the results received from said external medium, wherein said security measure information storing unit is initialized by using the sent-back newest security patch, and wherein, during a time period from start to end of the security check, information is distributed by connecting an information distributing server to said at least one terminal.

17. The system according to claim 16, wherein said security checking is started when the collected information by the security check client software has been transmitted to said security checking server.

18. A system for providing a terminal security checking service, the system comprising:

at least one terminal of which a security check is performed;

at least one external medium including storing means for storing a security check client software, security check result storing means for storing results of security checking, and security measure information storing means for storing a security patch for fixing a vulnerability in information held in said at least one terminal, said at least one terminal capable of establishing a terminal connection with said external medium, the terminal connection is established in response to inserting said external medium into said at least one terminal; and a security checking server to make a security check of information held in said at least one terminal, produce the results of security checking, and transmit the results to said external medium via network using said at least one terminal as an intermediary;

wherein said security check client software in said external medium is automatically run in response to the terminal connection being established between said external medium and said at least one terminal, and the security check client software collects information of said at least one terminal, and transmits the collected information to said security checking server using said at least one terminal as an intermediary, wherein said security check result storing means of the external medium stores the results received from said security checking server, wherein said security checking server is configured to receive the results from the external medium through external initializing means when said external medium is connected to said external initializing means by inserting said external medium into the external initializing means, wherein said security checking server sends back a newest security patch as information for security measures to the external medium through said external initializing means in response to the results received from said external medium, and wherein said security measure information storing means is initialized by using the sent-back newest security patch.

19. The system according to claim 18, wherein said external medium initializing means is so configured that a transmitting means to feed said newest security patch from said security checking server to said security measure information storing means is interposed between said security measure information storing means and said security checking server.

20. The system according to claim 18, wherein said external medium has a security check result storing means to receive the results from said security checking server and wherein said security check result storing means is connected to said security checking server.

21. The system according to claim 18, wherein said newest security patch is fed from said security measure information storing means to said at least one terminal by connecting said external medium to said at least one terminal.

22. A system for providing a terminal security checking service, the system comprising:
at least one terminal of which a security check is performed;
at least one external medium including storing means for storing security check client software, security check result storing means for storing results of security checking, and security measure information storing means for storing a security patch for fixing a vulnerability in information held in said at least one terminal, said at least one terminal capable of establishing a terminal connection with said external medium, the terminal connection is established in response to inserting said external medium into said at least one terminal; and
a security checking server to make a security check of information in said at least one terminal, produce the results of security checking, and transmit the results to said external medium via network and using said terminal as an intermediary;
a network connection managing system having network connectability judging means for judging whether or not a permission of connection to a network is to be given to the at least one terminal; and
means for transmitting the results from said security checking server to said network connectability judging means,
wherein said security check client software in said external medium is automatically run in response to the terminal connection being established between said external medium and said at least one terminal, and the security check client software collects information of said at least one terminal, and transmits the collected information to said security checking server using said at least one terminal as an intermediary,
wherein said security check result storing means of the external medium stores the results received from said security checking server,
wherein said security checking server is configured to receive the results from the external medium through external initializing means when said external medium is connected to said external initializing means by inserting said external medium into the external initializing means,
wherein said security checking server sends back a newest security patch as information for security measures to the external medium through said external initializing means in response to the results received from said external medium,
wherein said security measure information storing means is initialized by using the sent-back newest security patch, and
wherein said means for transmitting is so configured that a software processing means is installed between an output of said security checking server and an input of said network connectability judging means.

23. The system according to claim 22, wherein said software processing is performed by an application programming interface (API).

24. The system according to claim 22, wherein said network connectability judging means switches connection between networks to which said at least one terminal is to be connected.

25. A system for providing a terminal security checking service, the system comprising:
at least one terminal of which a security check is performed;
at least one external medium including storing means for storing security check client software, security check result storing means for storing results of security checking, and security measure information storing means for storing a security patch for fixing a vulnerability in information held in said at least one terminal, said at least one terminal capable of establishing a terminal connection with said external medium, the terminal connection is established in response to inserting said external medium into said at least one terminal; and
a security checking server to make a security check of information held in said at least one terminal, according to a security policy, produce the results of security checking, and transmit the results to said external medium via network using said at least one terminal as an intermediary; and
a network connection managing system, having means for storing a connectability policy, which judges whether said at least one terminal is to be or not to be connected to networks according to the results and according to said connectability policy,
wherein said security check client software in said external medium is automatically run in response to the terminal connection being established between said external medium and said at least one terminal, and the security check client software collects information of said at least one terminal, and transmits the collected information to said security checking server using said at least one terminal as an intermediary,
wherein said security check result storing means of the external medium stores the results received from said security checking server,
wherein said security checking server is configured to receive the results from the external medium through external initializing means when said external medium is connected to said external initializing means by inserting said external medium into the external initializing means,
wherein said security checking server sends back a newest security patch as information for security measures to the external medium through said external initializing means in response to the results received from said external medium,
wherein said security measure information storing means is initialized by using the sent-back newest security patch, and
wherein a policy distributing server to be connected to said security checking server and to said network connection managing system is installed and wherein said security policy and said connectability policy are distributed from said policy distributing server individually to each of said security checking server and said network connection managing system.

26. A system for providing a terminal security checking service, the system comprising:
at least one terminal of which a security check is performed;
at least one external medium including storing means for storing security check client software, security check result storing means for storing results of security checking, and security measure information storing means for storing a security patch for fixing a vulnerability in information held in said at least one terminal, said at least one terminal capable of establishing a terminal connection with said external medium, the terminal connection is established in response to inserting said external medium into said at least one terminal; and a security checking server to make a security check of information held in said at least one terminal, produce the results of security checking, and transmit the results to said external medium via network using said at least one terminal as an intermediary, wherein said security check client software in said external medium is automatically run in response to the terminal connection being established between said external medium and said at least one terminal, and the security check client software collects information of said at least one terminal, and transmits the collected information to said security checking server using said at least one terminal as an intermediary, wherein said security check result storing means of the external medium stores the results received from said security checking server, wherein said security checking server is configured to receive the results from the external medium through external initializing means when said external medium is connected to said external initializing means by inserting said external medium into the external initializing means, wherein said security checking server sends back a newest security patch as information for security measures to the external medium through said external initializing means in response to the results received from said external medium, wherein said security measure information storing means is initialized by using the sent-back newest security patch, and wherein, during a time period from start to end of the security check, information is distributed by connecting an information distributing server to said at least one terminal.

27. The system according to claim 26, wherein said security checking is started when the collected information by the security check client software has been transmitted to said security checking server.

* * * * *